May 6, 1952 R. W. LEWIS ET AL 2,595,963
PRIMARY ELECTRIC CELL
Filed March 1, 1948
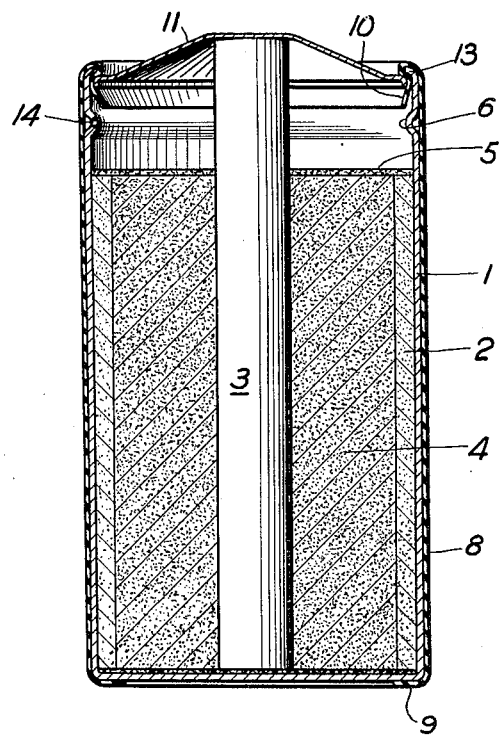
INVENTORS
Richard Percy Richardson
& Richard Walter Lewis
BY *A. E. Oroell*
ATTORNEY Patented May 6, 1952

2,595,963

UNITED STATES PATENT OFFICE 2,595,963

PRIMARY ELECTRIC CELL

Richard Walter Lewis, Hawkhill Dundee, Scotland, and Richard Percy Richardson, Erith, England, assignors to Burndept Limited, London, England, a British company Application March 1, 1948, Serial No. 12,366
In Great Britain January 17, 1947

2 Claims. (Cl. 136—132)

This invention relates to electric primary dry cells having a container of negative electrode metal, usually zinc, forming the negative electrode and enclosing the electrolyte, depolariser and positive electrode, the mouth of the container being sealed, for example, by bitumen, wax, pitch, or resin.

The container is consumed by electrolytic action during the life of the cell, and sooner or later will be perforated. Electrolyte will then escape and may cause damage, either by forming discharge paths for neighbouring cells if the leaking cell is one of a battery, or by corroding the metal of any apparatus with which the cell is employed. To remove this risk we have proposed to encase the cell container in a sheathing of plastic which will retain any electrolyte that may leak.

Cells may fail in another way, namely by bursting. While the cell is delivering current, and even when it is idle in storage, gas is generated, and considerable pressure is set up in the cell. For example, if a Leclanché cell is heavily discharged for a long time, as when it is unwittingly short-circuited, the paste in which the electrolyte is held, swells and breaks down into a viscous liquid; in addition water is formed by the electrolytic action; the block of depolariser mix also expands through the formation of zinc hydroxide; and finally ammonia appears in gaseous form. As a result the space usually left between the active elements and the seal at the mouth of the cell becomes filled, and the viscous liquid is forced out through the seal, or if the container is weakened or perforated by electrolytic action electrolyte exudes through the container. In the zinc oxide-potash-mercury oxide type of cell the electrolytic action causes evolution of hydrogen which may burst the cell. Also in both types of cell there is considerable evolution of gas in a hot climate or in any place where the temperature exceeds 40° C., even though the cell may be idle in store.

To prevent destruction of the cell through internal pressure we now deliberately perforate the container at a point which is covered by the plastic sheathing and is clear of the electrolyte. By means of an adhesive the sheathing is sealed at its edges to the container, that is to say a gas-tight joint is made between them, but the sheathing is not adherent to the container in the neighbourhood of the perforation. Any gas evolved can escape through this perforation and inflate the sheathing to some extent, if the gas is hydrogen it will slowly diffuse through the plastic sheathing. The use of this sheathing enables us to close the mouth of the cell with a metal cap, the cap being insulated from the container by the sheathing of plastic, which is folded over the lip of the container; we then use only a thin seal of wax above the active elements of the cell. Suitable plastics are rubber, polyvinylchloride, and the co-polymer of vinyl chloride and vinyl acetate.

The invention is illustrated in the accompanying drawings in its application to a Leclanché cell. The cylindrical zinc container 1, closed at the lower end, has within it a layer of paste 2 containing the electrolyte and a carbon electrode 3 surrounded by a depolarising mix 4. Above the paste and wax is a thin sealing layer of mix 5. An indentation 6 runs around the container just within its mouth. The container is wrapped in a sheathing 8 of plastic tube, preferably a tube of polyvinylchloride, which can be softened by warming and stretched over the container, upon which it will then shrink firmly, its lower end turning inward at 9 over the bottom of the container, while its upper end can be folded over the lip of the container as seen at 10. Both at 9 and 10 the sheathing may be sealed to the container by a suitable adhesive, such as a solution in a volatile solvent of the plastic of which the sheathing is made. The cell is closed by a domed disc of metal 11, which makes contact with the outer end of the carbon electrode 3, and the disc is secured in position by spinning inward the lip of the container, as seen at 13.

By these means the cell is sealed in gas-tight fashion. To obviate the risk above explained of pressure being generated within the cell which might burst the cell, or at least lift the cap 11 out of contact with the carbon 3 a perforation 14 is made through the container 1, but not through the plastic sheathing 8. This perforation must be made through a part of the container encased by the sheathing, and not at the margins where the sheathing is adherent to the container, nor beneath the level of the electrolyte paste. It may most conveniently be made, as indicated, in the peripheral indentation 6.

A precisely similar construction may be adopted in the case of a zinc-mercuric oxide cell.

We claim:

1. An electric primary dry cell comprising a container of zinc forming its negative electrode and enclosing the active parts of the cell, said container being sealed at its mouth, and a plastic sheathing stretched around the side wall of the container and sealed at its top and bottom edges to the container to form a tight enclosure around the container, the container having a small perforation in the part of its side wall between the top and bottom edges to which the sheathing is sealed and enclosed by the sheathing and beyond and out of contact with the active parts of the cell.

2. An electric primary dry cell according to claim 1, in which the container has a peripheral groove above the active parts of the cell and the perforation in the container being provided through the groove.

RICHARD WALTER LEWIS.
RICHARD PERCY RICHARDSON.

REFERENCES CITED

The following references are of record in the file of this patent:

UNITED STATES PATENTS

| Number | Name | Date |
|---|---|---|
| 439,151 | Hellesen | Oct. 28, 1890 |
| 1,732,069 | Schorger | Oct. 15, 1929 |
| 1,925,374 | Deibel | Sept. 5, 1933 |
| 2,289,249 | Deibel | July 7, 1942 |
| 2,396,693 | Glover | Mar. 19, 1946 |
| 2,416,079 | Anthony | Feb. 18, 1947 |
| 2,445,005 | Schmelzer | July 13, 1948 |
| 2,475,152 | Rock | July 5, 1949 |
| 2,505,014 | Terlizzi et al. | Apr. 25, 1950 |

FOREIGN PATENTS

| Number | Country | Date |
|---|---|---|
| 360,657 | Germany | Oct. 5, 1922 |
| 438,663 | Great Britain | Nov. 18, 1935 |